March 2, 1971   H. A. WILLIS ET AL   3,567,329
GAS SAMPLE ANALYSIS CELLS

Filed Sept. 30, 1968   5 Sheets-Sheet 1

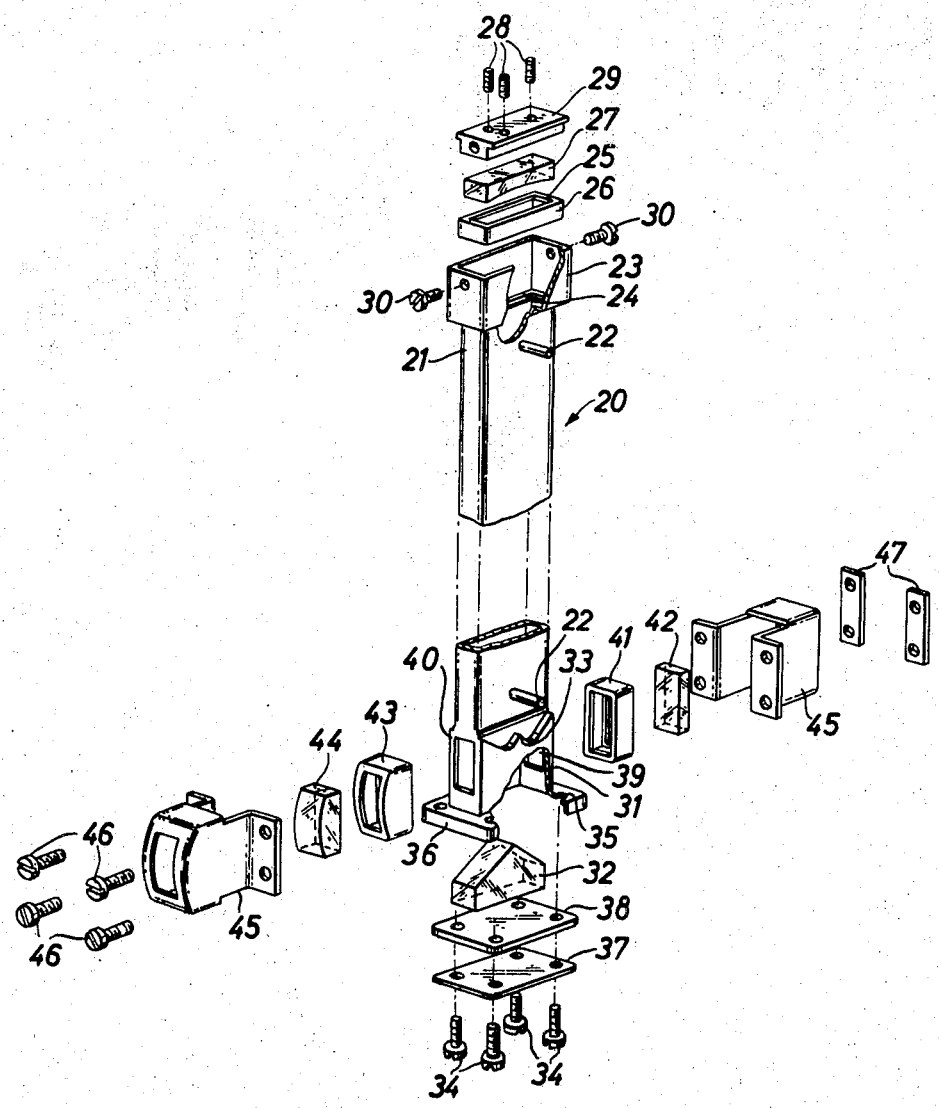

3,567,329
GAS SAMPLE ANALYSIS CELLS
Harry Arthur Willis and Edward Arthur Cudby, Welwyn Garden City, England, assignors to Perkin-Elmer Limited, Beaconsfield, England
Filed Sept. 30, 1968, Ser. No. 763,517
Claims priority, application Great Britain, Sept. 29, 1967, 44,404/67
Int. Cl. G01n 1/10, 21/06, 21/26
U.S. Cl. 356—246                                   9 Claims

ABSTRACT OF THE DISCLOSURE

A long gas sample cell (for use in, for example, an infra-red absorption spectrophotometer) of rectangular cross-section has specularly reflecting interior surfaces. Entrance and exit apertures are located generally at the one end of the cell; and a concave mirror at the other end of the tubular cell. The entrance and exit apertures are at least substantially at conjugate image planes relative to the converging mirror, so that radiation entering the entrance aperture (which is preferably at least near an image of the source of the spectrophotometer) is efficiently transferred through the other window. The long reflecting sidewalls of the cell act as a light pipe to increase the effective radiation flux density in the gas sample within the cell, without substantially disturbing the conjugate optical relationship between the apertures relative to the converging mirror. The radiation will therefore pass through the entrance aperture along the length of the cell to the converging mirror and substantially reimaged at the exit aperture, with the interior spectrally reflecting surfaces of the cell acting to "tunnel" more divergent rays and therefore both enchance the flux density within the cell and the total radiation intensity reaching the exit aperture. When the length of the sample space in the analytical instrument is typically limited, the axis of the long cell is arranged perpendicular to this sample space axis and a pair of plane reflectors (for example reflectively coated external surfaces of a right-angle prism) may be positioned, optically either before or after the apertures, to deflect the radiation (at right angles), the apertures in this type of construction being parallel to the longitudinal axis of the cell.

---

The present invention relates to analytical gas cells incorporating a light guide, such as used for example in infra-red spectrophotometry for gaseous samples.

In the type of gas cell defined, a comparatively large solid angle of radiation is admitted to a longitudinally extending gas cell having a comparatively small bore defined by specular faces. By virtue of the multiple reflections taking place between opposite faces, the rays which would normally fan out into a comparatively large volume are in fact channelled zig-zag fashion into the comparatively small volume of the long narrow bore and in this manner the radiation "packed" in each unit volume of the cell is increased. This scheme enables infra-red spectra to be obtained of samples which are too small or too dilute or both to absorb the beam to any useful extent in ordinary non-reflective cells even when their length is extended to the practical limit.

In its hitherto known construction, the reflective gas cell defines a "light pipe" specularly finished on the inside, closed at both ends by windows transparent to the spectrophotometric radiation, and provided with connections for flowing the gas under analysis from end to end. The known cell is normally mounted in a spectrophotometer so that the radiation source may be brought to a focus at any entry aperture situated at one end of the cell and the monochromater slit image may be located at an exit aperture situated at the other end. Since a considerable length of cell is required to produce a significant increase in radiation per unit volume through the cell, it follows that hitherto known cells can only be incorporated in specially designed instruments and cannot be easily adapted for use with designs intended for ordinary non-reflective cells.

In accordance with the present invention there is provided a gas cell of the type defined, wherein a rectilinear light guide the specularly reflecting inner surface of which defines a gas duct, an image-forming mirror at one end of said light guide, and one entry aperture and one exit aperture for an analytical radiation beam, e.g. a spectrophotometric beam, at the other end of said light guide are so constituted and arranged that the effective apertures are optically conjugate or as nearly so as convenient for any radiation which reaches the exit aperture from the entry aperture via said mirror, whether the radiation has undergone any number of multiple reflections or none at all.

The real-image forming mirror may, for example, be spherical or cylindrical; and the two apertures may be arranged side by side in symmetrical co-planar relationship or at any convenient angle to the longitudinal axis of the duct, in this latter alternative with the aid of means for deflecting the radiation beam, e.g. a prism.

The radius of curvature of the mirror may conveniently be chosen in relation to the distance between either aperture and the mirror to give a magnification ratio of approximately 1:1, bearing in mind, however, that the major criterion is not the formation of a cell defined image of the radiation source at the exit aperture but rather the efficient transfer of radiation energy through the gas cell from entry aperture to exit aperture and that some departure from the strict spatial relationships to be attained.

The cross-section of the gas duct may conveniently be rectangular and the inner surface may be made optically flat if desired, although a reasonable degree of flatness is all that is required in most cases. The surface may be made specular (i.e., specularly reflecting) by any of the well-known methods, paying due regard to the wavelength of the radiation for which the gas cell is intended and to chemical inertness, e.g. gold coatings would preferably be used for infra-red analysis.

The arrangement of the mechanical and optical parts will naturally be such as to ensure that in operation the gas under analysis may be flowed in a leak-proof manner from the end of the cell associated with the entry and exit apertures to the end bearing the mirror, suitable gas connections leading to the gas duct at both ends.

The entry and exit apertures may each be associated with a sealing window which is transparent to the analytical radiation, and the window may be either flat or shaped to function as positive or negative image-forming refractive means, as may be required for the optical matching of the gas cell to an analytical instrument, e.g. spectrophotometer, of a given design.

Preferably, the optical parts are made demountable so that they and the inteior of the cell may be cleaned with ease.

The invention will now be described by way of example with reference to the accompanying diagrammatic drawings, wherein:

FIG. 9 is an exploded view of a manufactured gas cell embodying the present invention.

Figure 1:
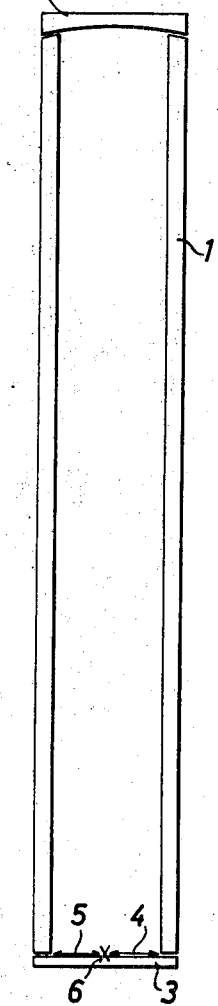
FIG. 1 is a cross-sectional view of a gas cell in accordance with the present invention in which exit and entry apertures lie on a plane at right angles to the longitudinal axis of the cell.
Figure 2:
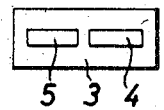
FIG. 2 is an end view of the cell of FIG. 1 showing co-planar entry and exit apertures.

The gas cell illustrated in FIG. 1 comprises a light pipe 1, having a bore of rectangular cross-section bounded by specular faces defining a gas duct. The light pipe is closed at one end by a spherical mirror 2 and at the other by a transparent window 3 overlying rectangular entry aperture 4 and rectangular exit aperture 5 (see also the FIG. 2 end view). The two apertures are symmetrically disposed end to end relative to the longitudinal (central) axis of the light pipe and lie on a common plane. The centre of curvature of the mirror 2, identified at 6, is at the intersection between said axis and said plane. End connections for flowing a gas under analysis from one to other extreme of the cell are omitted for greater clarity but these may be imagined as stub pipes welded to one wall of the cell.

For any rays which impinge on mirror 2 directly (i.e. without intervening multiple reflections) after passing through entry aperture 4 and which are projected by mirror 2 directly onto aperture 5 the two apertures must clearly be optically conjugate. We have actually found that if an image of a radiation source is formed at aperture 4 and the solid angle of the rays diverging into the light pipe 1 is sufficiently great for some of the rays to impinge upon the specular faces of the light pipe 1 the two apertures are still optically conjugate for these non-direct rays despite the intervening multiple reflections which vary in number with the angle of divergence.

It follows that a source image formed at the entry aperture 4 is imaged at the exit aperture 5 by both direct and non-direct rays. The gas cell of our invention is therefore equivalent to a prior art cell twice as long.

In the type of gas cell embodying a light pipe, the object is to utilize a large solid angle of radiation and to "compress" the cross-section of the beam within the cell by virtue of multiple reflections. These reflections cause some attenuation, however, and the smaller the number required to achieve the stated object the greater must be the efficiency with which energy is transferred. If our gas cell is compared with a prior art cell (that is, of the straight through light pipe type described above) of equal volume, it will show a further advantage in the form of a greater transfer efficiency because the increased cross-sectional area accompanying the reduction in physical length means that the rays diverging into the light pipe will travel farther before meeting the specular faces and consequently the number of internal reflections will be reduced.

Figure 3:
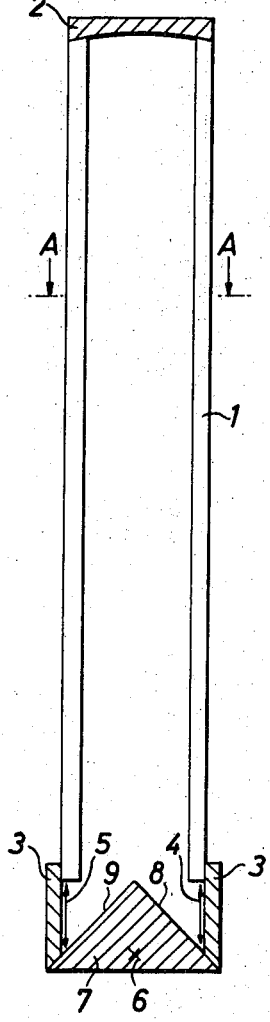
FIG. 3 is a cross-sectional view of a gas cell in accordance with the present invention embodying an end prism in proximity to the entry and exit apertures lying in opposed planes parallel with each other and the longitudinal axis of the cell.

Although FIG. 1 clearly illustrates the basis of the present invention, existing designs of spectrophotometers are such that our cell may be more easily accommodated in the sample compartment if means are included for enabling the cell to be used with its longitudinal axis at right angles to the axis of the optical path through said spectrophotometer sample compartment. FIG. 3 depicts a suitable modification directed to this end. In this figure and in those which follow like parts are denoted by like references.

Figure 4:
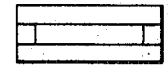
FIG. 4 is a cross-section along line A—A in FIG. 3.

In FIG. 3 entry aperture 4 and exit aperture 5 have been provided in opposite walls of the light pipe 1 and a 90° prism with front-aluminized faces 8 and 9 introduces the two symmetrical 90° deflections which are consequently required in the optical path through the cell. FIG. 4, which is a cross-section along line A—A in FIG. 3, merely shows that the light pipe 1 may be made up of four separate walls fastened together and suggests that apertures 4 and 5 are included in the two narrower walls.

Figure 5:
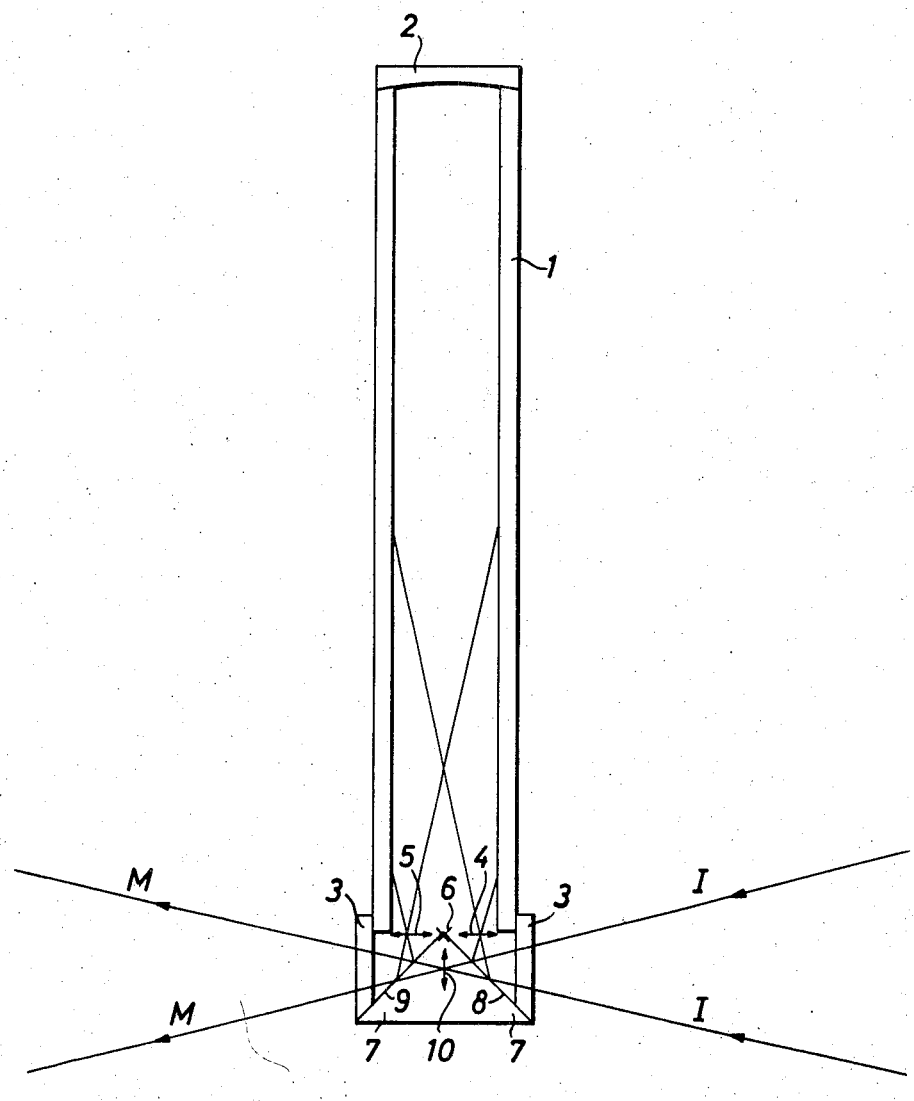
FIG. 5 is a cross-sectional view of a modification having the same relative location of the entrance and exit apertures of the cell depicted in FIG. 1.

In certain existing spectrophotometers the image of the monochromator slit is available within the sample compartment with sufficient clearance from the bounding walls of the sample compartment to enable the gas cell of FIG. 3 to be arranged for use in the manner depicted in FIG. 5, wherein said image, as shown at 10, is coincident with the longitudinal axis of the light pipe 1. The only modification required is to ensure that centre of curvature 6 of the mirror 2 is raised by the appropriate amount so that the FIG. 5 cell becomes virtually identical with that of FIG. 1 (as to the position of the effective "apertures" 4 and 5) except for the deflection to entry aperture 4 of the rays incoming from the radiation source (denoted by arrow heads I) and the deflection of the rays emerging from exit aperture 5 into the path leading to the monochromator (see arrows M). It will be noted that this arrangement has the advantage of interfering only to a minor extent with the optics (or more specifically the optical paths) of the spectrophotometer itself (since in theory the final image still acts as if it remains at 10) and therefore provides a good radiation transfer.

Figure 6:
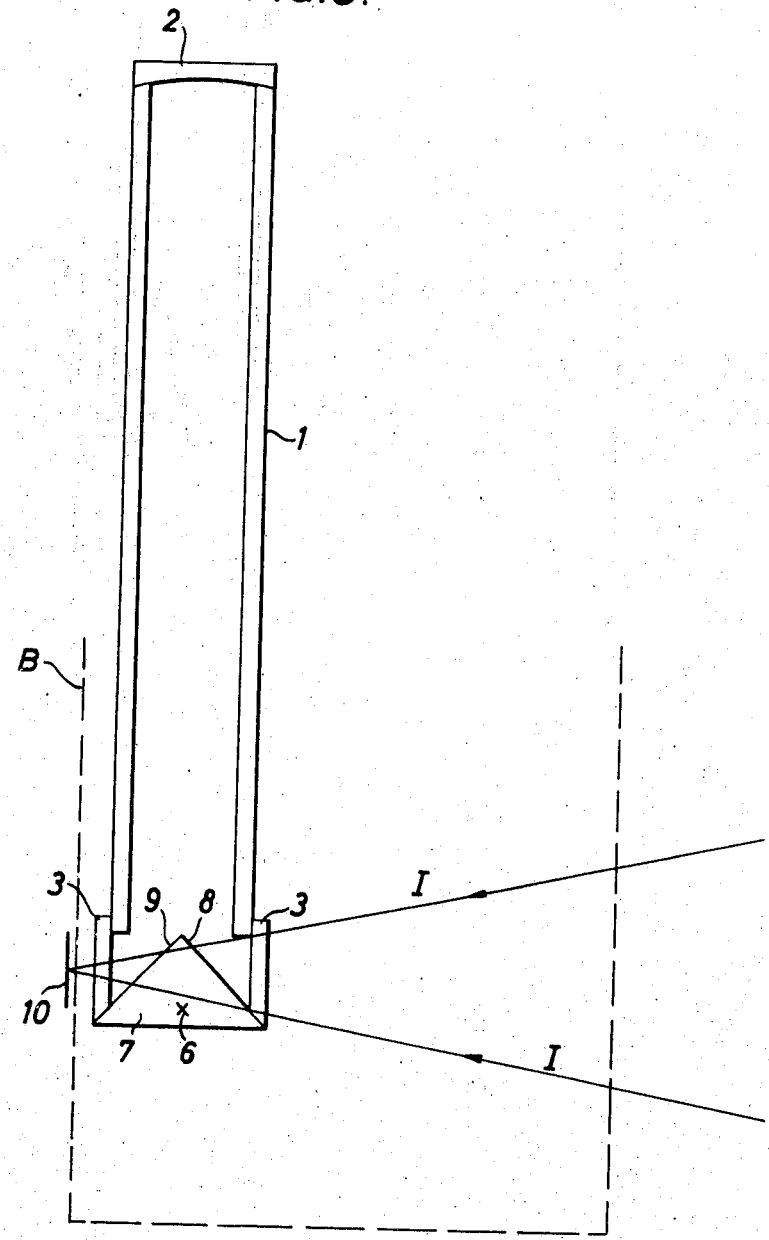
FIG. 6 illustrates the possibility of using a gas cell in accordance with the present invention even in a particularly unfavourable situation.

The situation is not so favourable when, as in the case depicted in FIG. 6, the monochromator slit image 10 is located behind the boundary wall B of the sample compartment shown in dotted outline, largely because in this case the source image cannot be made to coincide exactly with the slit image 10 of the monochromator (as is effectively true of the FIG. 5 form). The disturbance introduced in the optical system of the spectrophotometer is tolerable but the radiation transfer will be somewhat less efficient than in the arrangement of FIG. 5.

Figure 7:
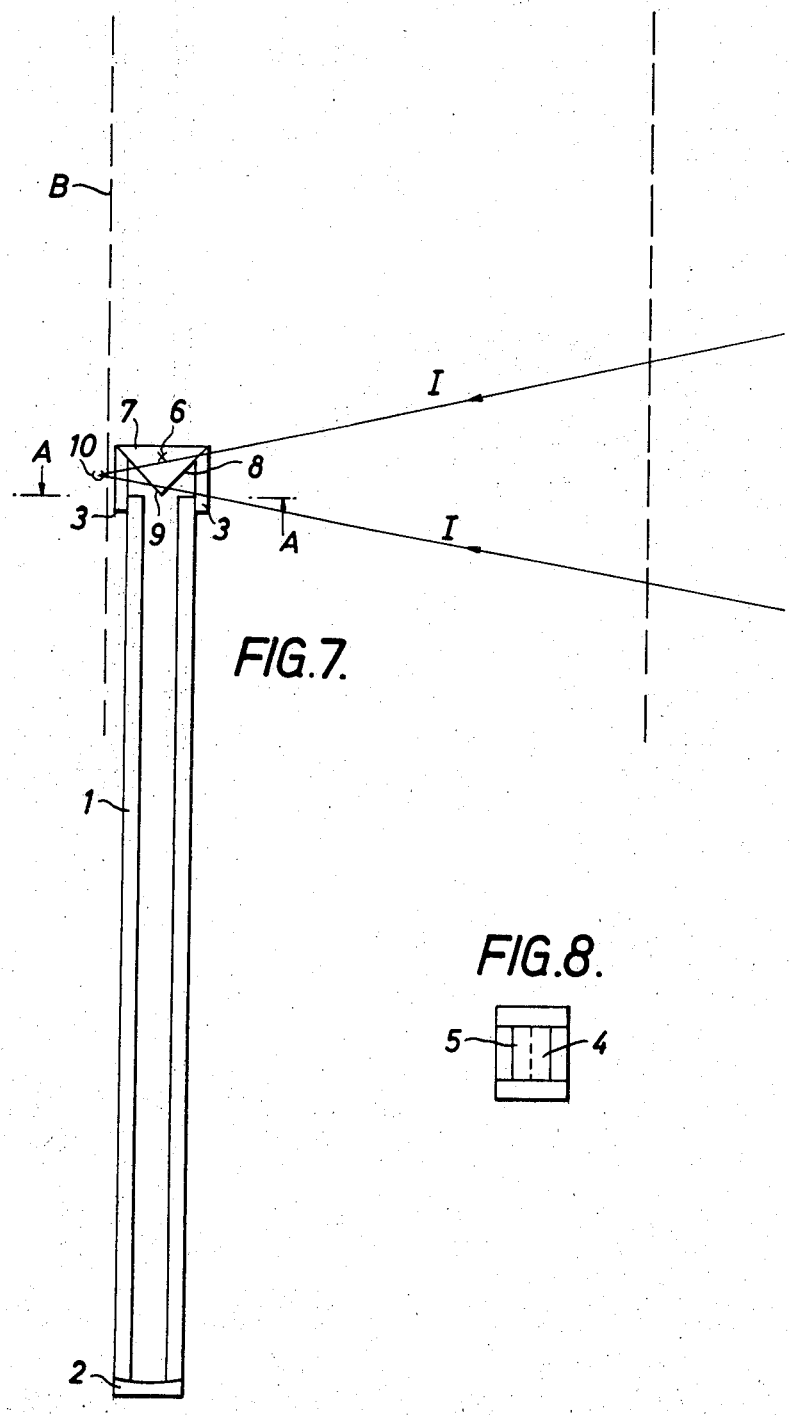
FIG. 7 illustrates the use of a gas cell in accordance with the present invention with the axis of the cell horizontally disposed.
Figure 8:
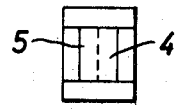
FIG. 8 is a cross-sectional view of FIG. 7.

In both FIG. 5 and FIG. 6 the cell is intended to be mounted vertically. A still further alternative is to mount the cell horizontally and this is shown in FIG. 7, wherein the slit image 10 is now perpendicular to the plane of the paper and the entrance aperture 4 and exit aperture 5 are arranged in a manner more clearly shown in FIG. 8, which is a cross-section along line A—A in FIG. 7. In certain circumstances the horizontal mounting may be more convenient. In addition it enables the cross section of the light pipe to be made more nearly square and this means fewer reflections and therefore slightly better transfer efficiency.

In all the alternatives hereinbefore referred to, an improvement in transfer efficiency can be introduced by means of lenses of suitable focal length to meet the circumstances of the case. The windows 3 may themselves be shaped in the form of lenses, either positive or negative as required. Typically, there may be used a lens over the entry aperture 4 to image the pupil stop of the radiation source at or near mirror 2 and a lens over exit aperture 5 to image the aperture stop of the monochromator at or near mirror 2.

A specific manufactured example of a gas cell embodying the present invention is shown in FIG. 9, which is an exploded view. The light pipe is generally indicated at 20 and is seen to comprise a thin-walled tube 21 of rectangular cross section having opposed stub connections 22 for the gas under analysis.

The cross-section of the light pipe 20 is enlarged at the top end to form an integral housing 23 having a bottom locating ledge 24. Against this ledge 24 a lower lip (not shown) similar to the shown upper lip 25 of resilient gasket 26 for mirror 27 will be pressed when screws 28, threaded in end plate 29 pivotally mounted in housing 23 by means of screws 30, are made to bear against the back of mirror 27 captive in gasket 26 and are adjusted not only to provide an adequate sealing pressure but also to set the mirror 27 in the correct optical plane, taking advantage in so doing of the resiliency of gasket 26.

At its bottom end the light pipe 20 is similarly provided with an enlarged cross-section forming a housing 31 for a prism 32, the apex of which abuts against the inner faces of locating V-shaped part 33 when urged towards them by screws 34 engaging threaded holes such as 35 in flange 36, said screws acting through a backing plate 37 and intervening sealing pad 38.

The housing 31 is provided with an entry aperture 39 and an exit aperture 40 for the radiation beam. A lipped gasket 41 holds captive a flat window 42 as in the case of gasket 26 and mirror 27 and similarly on the exit side, gasket 43 holds lens-shaped window 44. The two gasketed windows are pressed against the surrounding wall edges of the respective apertures in housing 31 by shroud brackets 45 tightly urged towards each other by screws 46 cooperating by engaging with threaded plates 47.

It will be appreciated from the foregoing description that gaskets 26, 38, 41 and 43 ensure gas tightness of the light pipe 20 and that therefore gas flow can only take place along the path included between stub connections 22.

What we claim is:

1. A gas sample analysis cell comprising:
    an elongated tubular member having first and second ends and comprising four specularly reflecting, flat inner surfaces at right angles to each other, defining a longitudinally extending parallelepipedal light guide, surrounding an elongated bore of rectangular cross-section, said bore having a longitudinal axis and comprising the major part of a sample-containing space of said cell;
    inlet and outlet connections to said tubular member for flowing a gas therethrough from end to end of said elongated bore surrounded by said light guide;
    entrance means for an incoming measuring radiation beam at said first end of said light guide including an entrance aperture on one side of a central plane through the longitudinal axis of said bore, said plane bisecting at right angles two opposed surfaces of said light guide;
    exit means for the outgoing measuring radiation at said first end of said light guide including an exit aperture on the opposite side of said plane from said entrance aperture;
    and a concave mirror at the second end of said light guide having its optical axis at least substantially coincident with said longitudinal axis of said bore of said light guide;
    said entrance aperture and said exit aperture being at such positions relative to said concave mirror as to be at least substantially optically conjugate relative thereto for inner rays of said incoming radiation beam which travel directly from said entrance aperture to said concave mirror and directly back to said exit aperture, so that, because of the light-guiding nature of said flat spectrally reflecting inner surfaces, the outer rays of said incoming radiation beam, which are specularly reflected by said surfaces even a plurality of time during their passage from said entrance aperture to said concave mirror and back to said exit aperture, also at least substantially form a conjugate image of said entrance aperture on said exit aperture,
    whereby substantially all of the incoming radiation beam passing through said entrance aperture of said entrance means, regardless of the number of intervening reflections, if any, at said specularly reflecting surfaces, will pass through said exit aperture as an outgoing radiation beam substantially in the same manner that radiation at a first location in a first image plane passes through the corresponding second location in a second conjugate image plane.

2. A gas sample analysis cell as claimed in claim 1, in which:
    said entrance aperture and said exit aperture are positioned substantially equidistant from said concave mirror,
    whereby said entrance aperture is imaged at said exit aperture at a magnification substantially equal to unity.

3. A gas sample analysis cell as claimed in claim 1, in which:
    said entrance and said exit aperture are positioned in a common plane at right angles to said longitudinal axis.

4. A gas sample analysis cell as claimed in claim 3, further comprising:
    first optical means positioned in front of said entrance aperture for deflecting said incoming measuring radiation beam to said entrance aperture;
    and second optical means positioned behind said exit aperture for deflecting said outgoing measuring radiation beam from said exit aperture,
    whereby said incoming radiation beam and said outgoing radiation beam are deflected before and after passage through said entrance and exit apertures.

5. A gas sample analysis cell as claimed in claim 1, in which:
    said entrance aperture and said exit aperture are positioned in two different opposed planes, which opposed planes are mutually parallel to each other and parallel to said longitudinal axis of said bore of said light guide;
    and further comprising first optical means positioned behind said entrance aperture for deflecting said incoming measuring radiation beam after passage through said entrance aperture;
    and second optical means positioned in front of said exit aperture for deflecting said outgoing measuring radiation beam before passage through said exit aperture.

6. A gas sample analysis cell as claimed in claim 1, in which:
    said specularly reflecting inner surfaces defining said light guide are gold plated.

7. A gas sample analysis cell as claimed in claim 1, in which:
    said concave mirror comprises a spherical mirror.

8. A gas sample analysis cell as claimed in claim 1, in which:
    said concave mirror comprises a cylindrical mirror.

9. A gas sample analysis cell as claimed in claim 1, in which:
    said cell further comprises an entry window and an exit window of material, transparent to the measuring radiation, positioned, respectively, in said incoming and outgoing radiation beam;
    at least one of said windows comprising at least one curved surface so as to function as a lensatic optical means, whereby at least one of said incoming radiation beam and said outgoing radiation beam is refracted so as to improve matching of the optical path thereof with the existing optical path of the analytical instrument with which said gas sample cell is used.

References Cited

UNITED STATES PATENTS

| | | | |
|---|---|---|---|
| 2,170,435 | 8/1939 | Sweeney | 356—51X |
| 2,703,844 | 3/1955 | Miller | 356—51X |
| 2,964,640 | 12/1960 | Wippler | 356—208X |
| 3,080,789 | 3/1963 | Rosin et al. | 356—246 |
| 3,418,053 | 12/1968 | Pelavin | 356—246X |
| 3,431,424 | 3/1969 | Allen | 356—246X |

FOREIGN PATENTS

| | | | |
|---|---|---|---|
| 394,853 | 1933 | Great Britain | 356—207 |
| 1,042,722 | 11/1953 | France | 356—208 |

RONALD L. WIBERT, Primary Examiner

W. A. SKLAR, Assistant Examiner

U.S. Cl. X.R.

73—421.5; 250—218